(12) United States Patent
Dixon et al.

(10) Patent No.: US 12,548,964 B2
(45) Date of Patent: Feb. 10, 2026

(54) SELF-ISOLATED NANOSCALE LASER

(71) Applicant: The Board of Trustees of the Leland Stanford Junior University, Stanford, CA (US)

(72) Inventors: Jefferson Dixon, Staten Island, NY (US); Mark Lawrence, Saint Louis, MO (US); David Russell Barton, III, Somerville, MA (US); Jennifer A. Dionne, Menlo Park, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 544 days.

(21) Appl. No.: 18/021,009

(22) PCT Filed: Aug. 16, 2021

(86) PCT No.: PCT/US2021/046119
§ 371 (c)(1),
(2) Date: Feb. 13, 2023

(87) PCT Pub. No.: WO2022/036314
PCT Pub. Date: Feb. 17, 2022

(65) Prior Publication Data
US 2023/0299551 A1    Sep. 21, 2023

Related U.S. Application Data

(60) Provisional application No. 63/065,908, filed on Aug. 14, 2020.

(51) Int. Cl.
*H01S 3/08* (2023.01)
*H01S 3/094* (2006.01)
(Continued)

(52) U.S. Cl.
CPC .......... *H01S 3/08054* (2013.01); *H01S 3/094* (2013.01); *H01S 3/094073* (2013.01); *H01S 3/1628* (2013.01); *H01S 3/30* (2013.01)

(58) Field of Classification Search
CPC ................. H01S 3/08054; H01S 3/094; H01S 3/094073; H01S 3/30
See application file for complete search history.

(56) References Cited

U.S. PATENT DOCUMENTS 1,118,765  A    11/1914  Hastings
7,567,604  B2    7/2009  Accard
(Continued)

OTHER PUBLICATIONS

Plum, "Chiral mirror," 2015, Applied Physics Letters, 106, 221901-1-221901-5. (Year: 2015).*
(Continued)

*Primary Examiner* — Michael Carter
(74) *Attorney, Agent, or Firm* — LUMEN PATENT FIRM

(57) ABSTRACT

Self-isolated lasers are provided by using a chiral metasurface in combination with a spin-selective gain medium and symmetry-breaking (i.e., not linearly polarized) optical pumping. In preferred embodiments the chiral metasurface is resonant, thereby proving an integrated optical resonator to support lasing. The chiral metasurface can be the spin-selective gain medium, or it can be formed on a surface of the spin-selective gain medium, or it can be distinct from the spin-selective gain medium.

11 Claims, 10 Drawing Sheets

(51) Int. Cl.
    *H01S 3/16*     (2006.01)
    *H01S 3/30*     (2006.01)

(56) References Cited

U.S. PATENT DOCUMENTS

| | | |
|---|---|---|
| 9,097,847 B2 | 8/2015 | Takahashi |
| 11,500,265 B2 | 11/2022 | Semmlinger |
| 2014/0072008 A1 | 3/2014 | Faraon |
| 2017/0235162 A1 | 8/2017 | Shaltout |
| 2018/0106873 A1 | 4/2018 | Wu |
| 2018/0287348 A1 | 10/2018 | Kante |
| 2019/0229498 A1 | 7/2019 | Gwo |
| 2020/0073029 A1 | 3/2020 | Han |
| 2021/0286188 A1 | 9/2021 | Rubin |

OTHER PUBLICATIONS

Semnani, "Spin-preserving chiral photonic crystal mirror," 2020, Light: Science & Applications (2020)9 :23, p. 1-12. (Year: 2020).*

Xu et al. (Nov. 2015). Metasurface external cavity laser. Applied Physics Letters, 107(22), 221105-2211055. doi:101063/14936887.

* cited by examiner

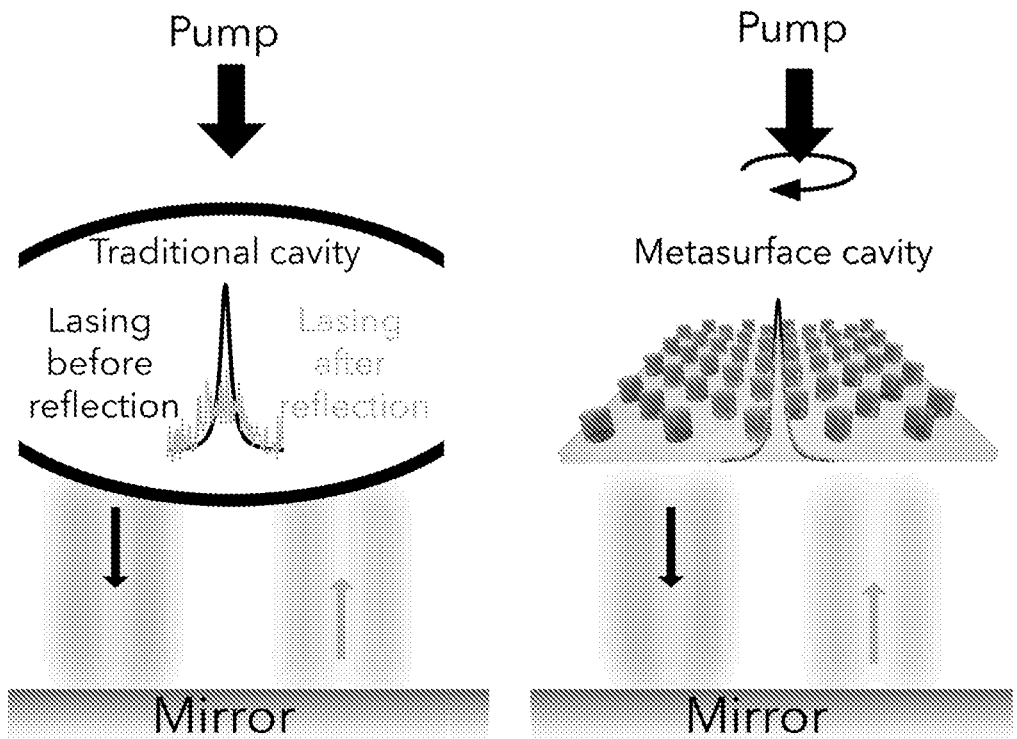
FIG. 2A
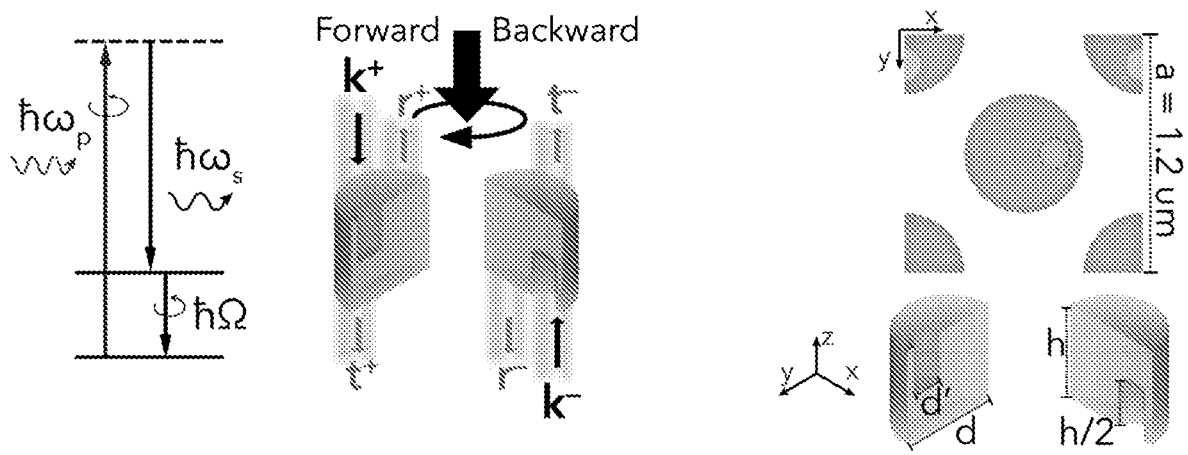
FIG. 2B
FIG. 2C

SELF-ISOLATED NANOSCALE LASER

FIELD OF THE INVENTION

This invention relates to self-isolation of lasers.

BACKGROUND

Lasers are notoriously sensitive to back reflection, where back reflections of 1% or less of the output laser power can destabilize the laser. The usual remedy for this problem is the use of optical isolators that depend on magneto-optic effects to provide isolation. However, such isolators are bulky devices whose size is often incompatible with desired levels of photonic integration. Thus, it would be an advance in the art to provide improved isolation of lasers.

SUMMARY

In this work, self-isolated lasers are provided by using a chiral metasurface in combination with a spin-selective gain medium and symmetry-breaking (i.e., not linearly polarized) optical pumping. In preferred embodiments the chiral metasurface is resonant, thereby proving an integrated optical resonator to support lasing. The chiral metasurface can be the spin-selective gain medium, or it can be formed on a surface of the spin-selective gain medium, or it can be distinct from the spin-selective gain medium.

The example of Section B below uses a spin-polarized Raman pump as the gain mechanism. The metasurface lasing cavity possesses a nonzero chirality parameter and asymmetric permittivity that, together, impose isolation on the lasing mode emitted from that cavity. Here, optical isolation is not considered as an additional photonic component but as a feature built natively into the light source itself.

The example metasurface is designed in silicon for operation at telecommunication frequencies, and the cylindrical nanoantennas that comprise the metasurface are <1 um in height and <1 um in diameter. However, we note that other materials and geometries for the metasurface are possible, including solid-state materials that provide gain like InGaAs, GaAs, GaN, and AlN, rare-earth (lanthanide) doped materials, and polymeric gain media (where gain is provided by a dye). By manipulating the height, diameter, periodicity, and symmetry of the cylinders in the provided example, we achieve a chiral optical response with a spin-selective transmittance for orthogonal polarizations of circularly-polarized light. Importantly, we break Lorentz reciprocity with a spin-polarized Raman bias (e.g., a Raman pump with non-zero ellipticity) that avoids dynamic reciprocity, which has no lower size limit and can be applied to a wide array of dielectric materials.

Because of this input state of polarization, a signal beam at a frequency Stokes-shifted from the Raman pump is only amplified when the signal obeys the photon-phonon spin selection rules imposed by the Raman pump in addition to separate spin selection rules imposed by the symmetry of the chiral metasurface. A signal with a given polarization state transmits with amplification in one direction, but its reflection is suppressed in the metasurface cavity, resulting in a self-isolated lasing mode. Here, we numerically demonstrate Raman lasing in the forward direction that is suppressed by an order of magnitude in reflection. We also present a broad parameter space over which the lasing properties can be optimized, including modifying the chiral resonance by changing the nanoantenna dimensions, tuning the signal frequency relative to the two eigenmodes of the metasurface, and/or modifying the signal polarization.

Light sources as in this work are suitable for applications including, but not limited to: photonic integrated circuits; small-scale, low latency, high-bandwidth information processing; photonic networks; and optical communication systems.

Significant advantages are provided, including:
1) Isolated devices as in this work can be orders of magnitude smaller than current optical isolators.
2) This approach combines a coherent light source and optical isolation into a single, subwavelength, scalable device.
3) Such devices can be designed in silicon, which is readily processed with industry-standard techniques.
4) This approach is compatible with various other dielectric materials.
5) Such designs can be exactly scaled to operate at a desired frequency.
6) This approach provides tunable emission properties that are independent of signal power, based on Raman lasing.

Variations on this work include gain mechanisms other than stimulated Raman scattering, including stimulated emission from inversion-asymmetric Transition Metal Dichalcogenides (e.g. $MoS_2$, $WS_2$, $MoSe_2$, $WSe_2$, $MoTe_2$). Preferably the chiral metasurface is a high-Q chiral metasurface (Q>10), where a higher quality factor (Q>100) can be used to further reduce the pump power.

BRIEF DESCRIPTION OF THE DRAWINGS

FIG. 2A schematically shows a conventional laser (left) compared to an exemplary self-isolated laser (right).

FIG. 2B shows the Raman energy levels and propagation directions for the example of section B.

FIG. 2C shows a unit cell of the metasurface of the example of section B.

DETAILED DESCRIPTION

Section A describes general principles relating to embodiments of the invention. Section B describes a detailed example. Section C is supplemental information for the example of Section B.

A) General Principles

Figure 1A:
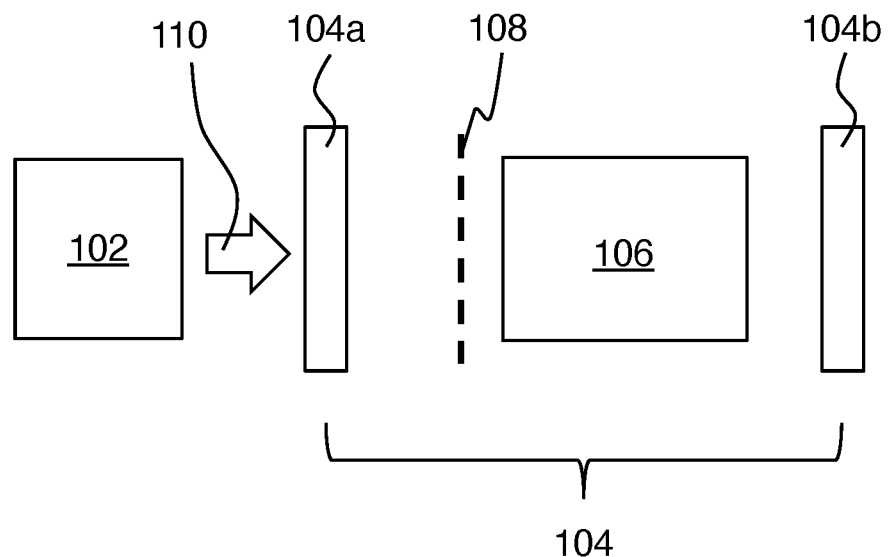
FIGS. 1A-C show several exemplary embodiments of the invention.

FIG. 1A shows a first exemplary embodiment of the invention. This example is a self-isolated coherent light source including a pump source 102 configured to provide pump radiation 110 having a not-linear state of polarization. It also includes a spin-selective gain medium 106 configured to provide gain when excited by the pump radiation, an optical resonator 104 configured to define a lasing mode when the spin-selective gain medium 106 is excited by the pump radiation 110, and a chiral metasurface 108 configured to provide less loss to the lasing mode than to a back-reflection of the lasing mode.

Suitable spin-selective gain mediums include but are not limited to Raman-active media and inversion-asymmetric transition metal dichalcogenides.

Practice of the invention does not depend critically on whether or how the components 104, 106, 108 are integrated with each other. In the example of FIG. 1A, the chiral metasurface 108 is distinct from the spin-selective gain medium 106, and the chiral metasurface 108 is distinct from the optical resonator 104.

Figure 1B:
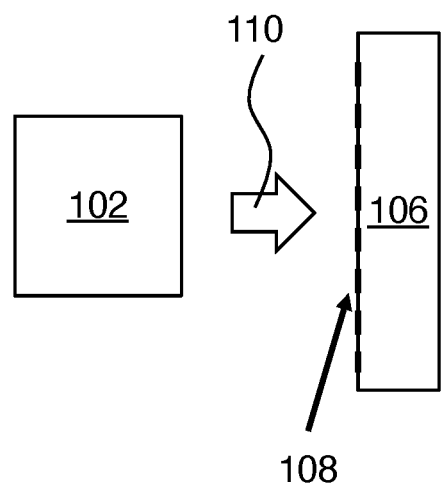

In the example of FIG. 1B, the chiral metasurface 108 is formed of a surface of the spin-selective gain medium 106.

Figure 1C:
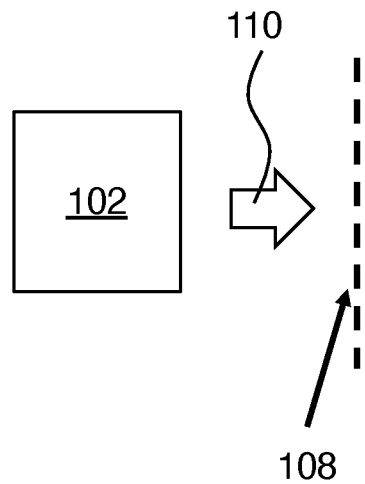

In the example of FIG. 1C the chiral metasurface 108 is also the spin-selective gain medium.

In the examples of FIGS. 1B and 1C, the chiral metasurface 108 has a resonance that serves as the optical resonator. For a resonant chiral metasurface, the resonance bandwidth is defined at the polarization eigenstate of the metasurface. Then we can use the ordinary definition of the quality factor, which is the ratio of the resonance center-frequency to the resonance bandwidth. Preferably the Q of a resonant chiral metasurface is 10 or more, more preferably Q is 100 or more.

Figure 1D:
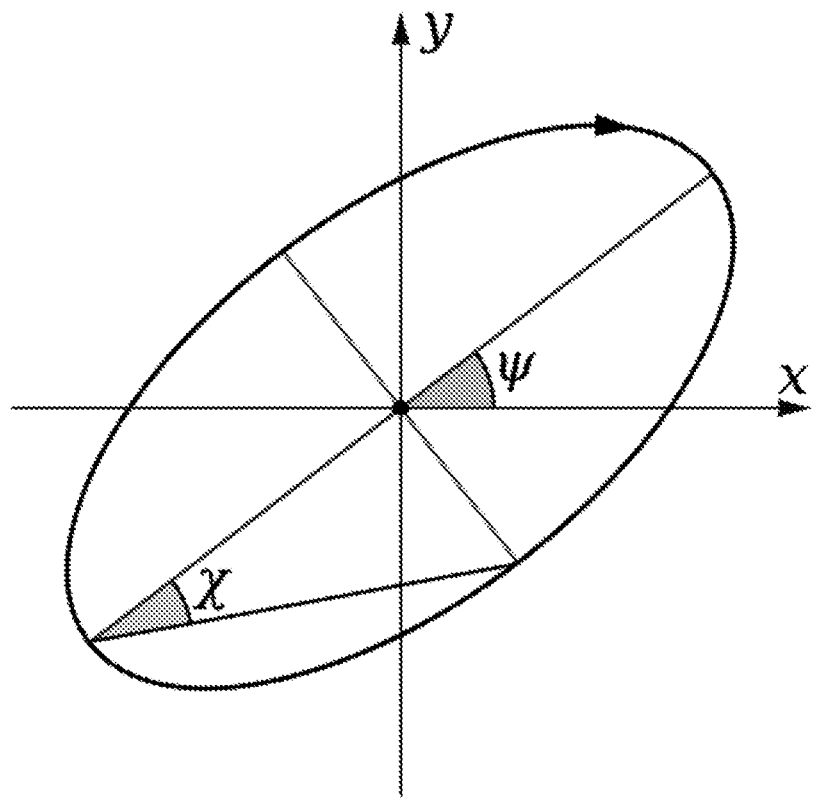
FIG. 1D shows how ellipticity of a state of polarization is defined relative to the polarization ellipse.

Here a not-linear state of polarization is any state of polarization that is not purely linear (i.e., ellipticity (e) satisfies the condition $0<|e|\leq1$). Note that $e=0$ for linear polarization. Preferably the state of polarization of the pump radiation 110 satisfies the condition $0.5 \leq |e| \leq 1.0$. More preferably, $0.9 \leq |e| \leq 1.0$ for the state of polarization provided by the pump. Here we define the ellipticity e of a state of polarization as $e=\sin 2\chi$, where $\chi$ is related to the polarization ellipse as shown on FIG. 1D. Thus, this ellipticity parameter is a normalized S3 of the Stokes parameters. The ideal case of pure circular polarization corresponds to $e=+1$ or $e=-1$, where the signs distinguish right-handed polarization from left-handed polarization. The relation of the signs to the handedness of the polarization is a matter of convention that is not critical in practicing the invention.

B) Detailed Example

Integrated photonics promises the broadband, high-density and high-speed interconnectivity necessary for advanced telecommunication networks and high-performance signal processing. Coherent light sources are critical components of such photonic systems, and these devices should be compact, efficient and preferably compatible with mature CMOS fabrication technologies. While considerable progress has been made in developing integrated light sources, the resonant nature of these light sources dictates that these photonic systems are sensitive to small perturbations caused by unwanted reflections and defects. An optical isolator solves this issue by serving as a one-way valve for light, in which light is blocked in one direction but allowed to pass in the opposite direction, protecting the laser from back-reflections, reducing unwanted interference and allowing for greater interconnectivity. Isolation is critical to the realization of photonic networks, without which we are limited to low-power sources with sparse interconnection and impractically long optical pathways.

The most common embodiment of optical isolation, a Faraday isolator, relies on a fixed magnetic bias to break reciprocity for a time-reversed pair of modes. However, breaking reciprocity without further modal restriction is not sufficient to define isolation; consequently, a Faraday isolator includes polarization filters to restrict access to modes that would otherwise propagate in the forbidden direction. Unfortunately, the weak interaction of magnetic fields with most materials at optical frequencies makes a Faraday isolator much larger (>100 μm) than the integrated light sources we seek to isolate.

New nonreciprocal photonic components attempt to overcome this scaling problem by enhancing light-matter interactions through resonant confinement in high quality factor (i.e. high-Q) dielectric structures. In recent work, a periodic array of subwavelength nano-antennas (i.e. a metasurface) is used to resonantly confine a circularly-polarized optical bias that breaks optical reciprocity. Conveniently, the high-Q confinement of the metasurface cavity can also be used to amplify an optical pump or signal, similar to other periodic dielectric structures that have been used to demonstrate compact, low-threshold lasing. Analogously to the requirement of polarization filters in a Faraday isolator, the metasurface cavity is nonreciprocal but requires further modal restriction to be isolated.

Here, we present a new approach to isolate integrated light sources by tailoring the modal properties of the lasing cavity itself, specifically using a spin-selective chiral metasurface cavity excited with spin-polarized stimulated Raman scattering. Using full-field electromagnetic simulations, we explore a silicon metasurface composed of notched cylinders resonant in the near-infrared. By manipulating the coupling between neighboring cylinders in a dimer unit cell, we achieve an intrinsically chiral optical response with a spin-selective transmittance for orthogonal polarizations of circularly-polarized light. To break Lorentz reciprocity explicitly, we excite the metasurface with a spin-polarized Raman pump that mimics the magnetic bias in a Faraday isolator. Consequently, a signal beam at a frequency Stokes-shifted from the Raman pump is only amplified when the signal obeys photon-phonon spin selection rules imposed by the Raman pump in addition to separate spin selection rules imposed by the symmetry of the chiral metasurface (FIGS. 2A-B). A signal with a given polarization state transmits with amplification in one direction, but its reflection (or time-reversed signal) is suppressed in the metasurface cavity, resulting in a self-isolated lasing mode.

FIG. 2A shows a schematic of a self-isolated metasurface laser. The Raman pump results in stimulated emission at the Stokes frequency. Left: In a traditional laser cavity, the original lasing mode is destroyed when reflected light re-enters the cavity. Right: Due to spin-selective modal restriction of the metasurface cavity, the lasing mode remains undisturbed upon reflection. FIG. 2B is an energy diagram for Raman decay of a pump photon into a Stokes photon and a phonon, with a reference legend defining forward/backward transmission/reflection.

A schematic of the unit cell of the metasurface is shown in FIG. 2C. The unit cell of the metasurface array is composed of two silicon (n=3.45) cylinders in a square lattice, each 600 nm tall and 600 nm in diameter with a lattice periodicity of 1.2 Both cylinders in the dimer unit cell are modified with the introduction of notches, 160 nm in diameter and 300 nm in depth. In one cylinder, the notch is translated in the y-direction, while in the other cylinder, the notch is translated in the x and −z-directions. The geometry is necessarily three-dimensionally chiral, as a planar chiral geometry will maintain a symmetric response in the forward and backward directions and therefore cannot act as a filter for the same handedness of light from both directions. To the best of our knowledge, intrinsic chirality has not been observed in a subwavelength/non-diffracting dielectric metamaterial system.

While spin-selective optical properties have been reported in plasmonic (i.e. metallic) metasurfaces, three-dimensional chirality in dielectric metasurfaces requires near-field interactions that are not guaranteed with a geometrically chiral structure. For any material platform, optical chirality is defined by the coupling of electric and magnetic fields along the same direction, as described by the generalized constitutive relations, $$\overline{D} = \varepsilon_o \overline{\overline{\varepsilon}} \overline{E} + \frac{i}{c_0} \overline{\overline{\xi}} \overline{H}; \overline{B} = \frac{i}{c_0} \overline{\overline{\zeta}} \overline{E} + \mu_0 \overline{\overline{\mu}} \overline{H}. \qquad (1)$$

Here, $\overline{\overline{\varepsilon}}$, $\overline{\overline{\mu}}$, $\overline{\overline{\xi}}$, and $\overline{\overline{\zeta}}$ are 2×2 complex-valued matrices representing permittivity, permeability, and coupling of the magnetic (electric) field to electric (magnetic) dipoles, respectively. The coupling terms are more explicitly written for reciprocal media as, $$\overline{\overline{\xi}} = -\overline{\overline{\zeta}}^T = \begin{pmatrix} \xi_C & i\xi_\Omega \\ i\xi_\Omega & \xi_C \end{pmatrix} \qquad (2)$$

where the off-diagonal components indicate omega-type bianisotropy and the diagonal components are strictly chiral. Plasmonic structures support effective dipole moments that rely on incident light interacting with free electrons on the surface of the metal, where an electric dipole resonance is easily achieved by orienting a wire along the direction of the incident electric field, and a magnetic dipole resonance is achieved by shaping the wire into a current loop (e.g. a split ring resonator). Accordingly, the magnetic resonance in plasmonic objects is inherently coupled to the electric resonance from which it is formed, and therefore the magnetic resonance of a plasmonic geometry is already a coupled magnetoelectric mode. In contrast, dielectric structures support both electric and magnetic modes inherently within the volume of the material itself, as described by Mie theory, and these modes are decoupled from one another. Engineering chiral modes in dielectric objects therefore requires us to carefully consider how geometric perturbations and symmetry conditions affect coupling of the independent modes.

To achieve a three-dimensionally chiral metasurface, we employ a four-step approach to designing the constituent nanoantennas and unit cell: i) spectrally overlapping the electric and magnetic modes; ii) breaking in-plane mirror symmetry to couple the overlapped modes; iii) eliminating rotational symmetry to reorient the direction of the electric mode relative to the magnetic mode; and iv) breaking the remaining in-plane mirror symmetry to remove all symmetry of the unit cell and induce a spin-selective response. We first tune the spectral position of the electric and magnetic resonances individually by modifying the diameter and height of the cylinders. Then, we introduce a notch into the center of the cylinders that breaks mirror symmetry in the plane of the metasurface to couple the electric and magnetic modes.

Figure 3A:
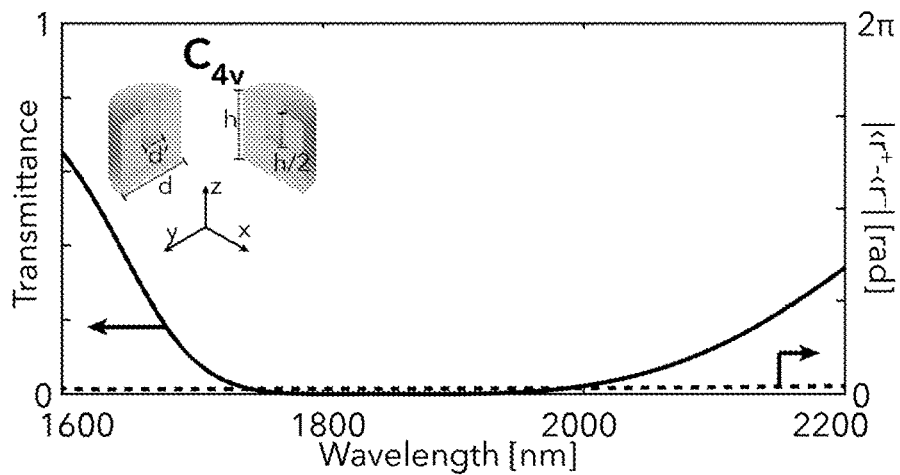
FIGS. 3A-C relate to the metasurface design of the example of section B.
Figure 3B:
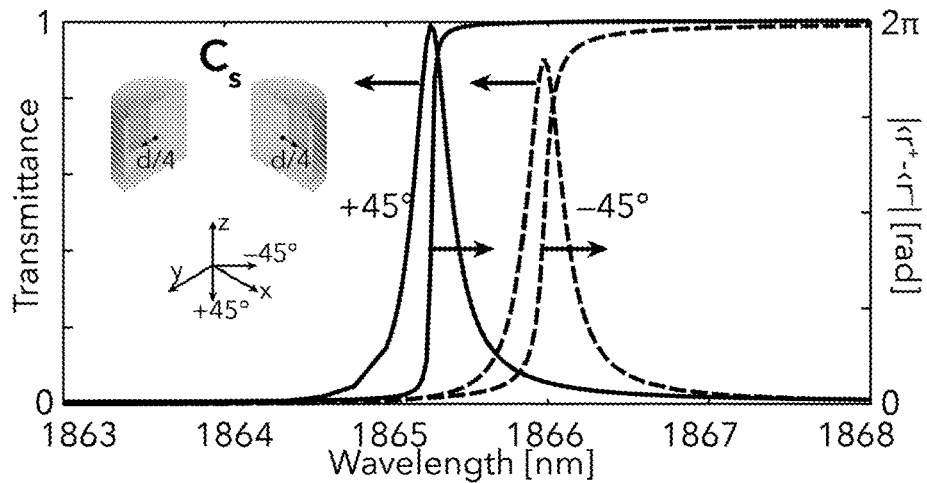
Figure 3C:
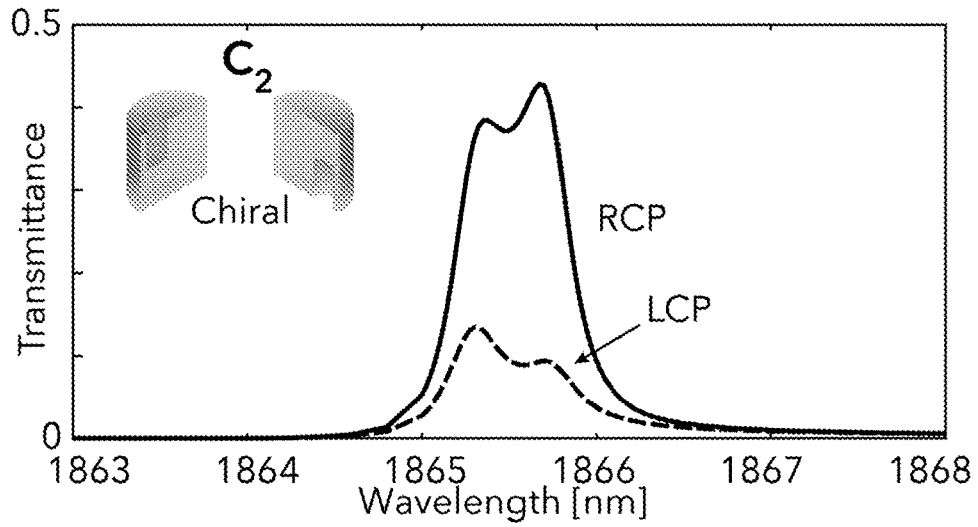

FIGS. 3A-C show transmission (FIGS. 3A-C) and differential reflected phase to show bianisotropy (FIGS. 3A-B) for the given unit cell geometry and associated point group symmetry (insets), where d=600 nm, h=600 nm and d'=160 nm. FIG. 3A relates to cylinders notched in the center: Transmission shows low-Q response over which electric and magnetic dipolar modes exist, and the differential reflection reveals weak but nonzero bianisotropy. FIG. 3B shows the result of translating the notches antisymetrically: Transmission reveals two high-Q resonances corresponding to illumination with +45 deg and −45 deg polarization, both of which exhibit strong bianisotropy in the phase of reflection. FIG. 3C shows the result of inverting every other notch: Differential transmission is observed for illumination for left-handed versus right-handed circularly-polarized light, indicating chirality.

A key characteristic of this bianisotropic (magnetoelectric) coupling is asymmetry in reflection, which for a lossless material appears in the relative phase of the reflection. This asymmetry cannot be observed in transmission because the phase relationship of the electric and magnetic nearfields remains constant as the wavevector orientation remains constant, while flipping the wavevector direction in reflection also flips the phase relationship of the magnetoelectric coupling. FIG. 3A plots the transmission through the notched metasurface and the difference in the forward and backward reflected phase. The transmission reveals a broad reflective background from the dipolar magnetic and electric modes (1700-2100 nm), and the differential reflected phase reveals a weak but nonzero bianisotropic response ($\xi_\Omega \neq 0$) with $|\angle r^+ - \angle r^-|=0.03\pi$, where $\angle r^+$ is the phase of reflected light incident from the forward direction (FIG. 2B). Here, the strength of magnetoelectric coupling is limited by the low Q-factor associated with such broad magnetic and electric resonances. Regardless of the strength of the response, we now have a symmetry breaking tool to control magnetoelectric coupling and therefore the phase relationship between the electric and magnetic response of the metasurface. Note, however, that this response remains degenerate for orthogonal polarizations due to the presence of four-fold rotational symmetry in the metasurface lattice.

To differentiate orthogonal polarization states, we eliminate rotational symmetry from the lattice by translating the notch in the x-direction in one cylinder and symmetrically in the y-direction in the neighboring cylinder. This translation reorients the direction of the dipole moments without the further removal of silicon, so as to not disrupt the dipolar characteristic of the modes that occur within the volume. Importantly, this subtle symmetry breaking also increases the Q-factor of the metasurface, resulting in a strong bianisotropic response $|\angle r^+ - \angle r^-|=\pi$. Illuminating the metasurface with light polarized along the ±45° symmetry axes, two distinct peaks in transmission, with Q's of 7040 and 6980 and are seen for the two polarization states at 1865.3 nm and 1865.7 nm, respectively (see FIG. 3B). This splitting is characteristic of a dimer unit cell, which exhibits a lower energy symmetric (bonding) mode and a higher energy antisymmetric (antibonding) mode. Here, the mirror symmetry across the +45° axis is the only symmetry remaining in the lattice that prevents a chiral response.

Figure 5A:
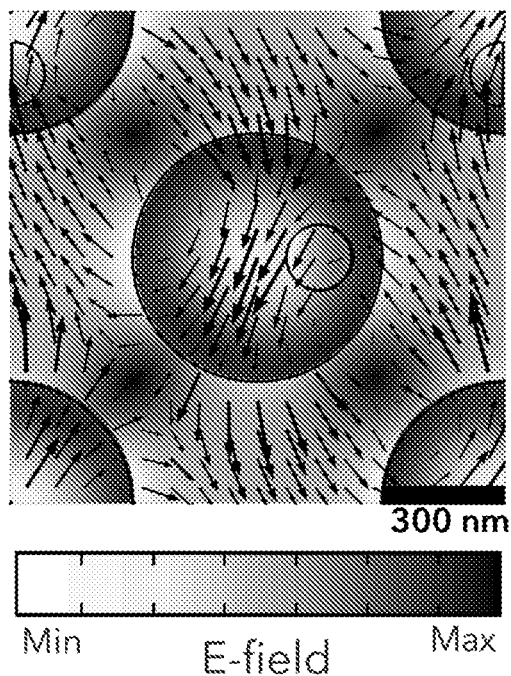
FIGS. 5A-C show further details of metasurface designs.

Finally, we break all symmetry of the unit cell by shifting the notches to the bottom of every other cylinder, leading to a chiral, spin-selective response in transmission. A chiral medium must orient at least some component of the electric and magnetic dipole moments along the same direction, which we accomplish by exploiting a coupled dimer unit cell. This configuration allows the electric dipole of one cylinder to couple with the magnetic dipole of its neighbor, resulting in a nonzero $\xi_c$ term in Equation (2). Consequently, we achieve the chiral optical response shown in FIG. 3C. On resonance at 1865.5 nm, left- and right-handed circularly-polarized (L- and R-CP) light is transmitted with a relative difference of LCP/RCP=5 (section C1). This difference can be enhanced even further, but here we are more limited by polarization conversion between L-CP and R-CP and not the difference in transmittance between L-CP and R-CP. The two distinct peaks at 1865.3 nm and 1865.7 nm in FIG. 3C exactly correspond to the two eigenstates produced in FIG. 3B, which have only changed in direction and not in energy. Importantly, by relying solely on small notches, the electric field remains concentrated within the silicon (FIG. 5A). While this intrinsically chiral metasurface exhibits asymmetric transmission for a given polarization state, it necessarily remains reciprocal without a time-dependent or nonlinear modification to the constitutive parameters.

Figure 6:
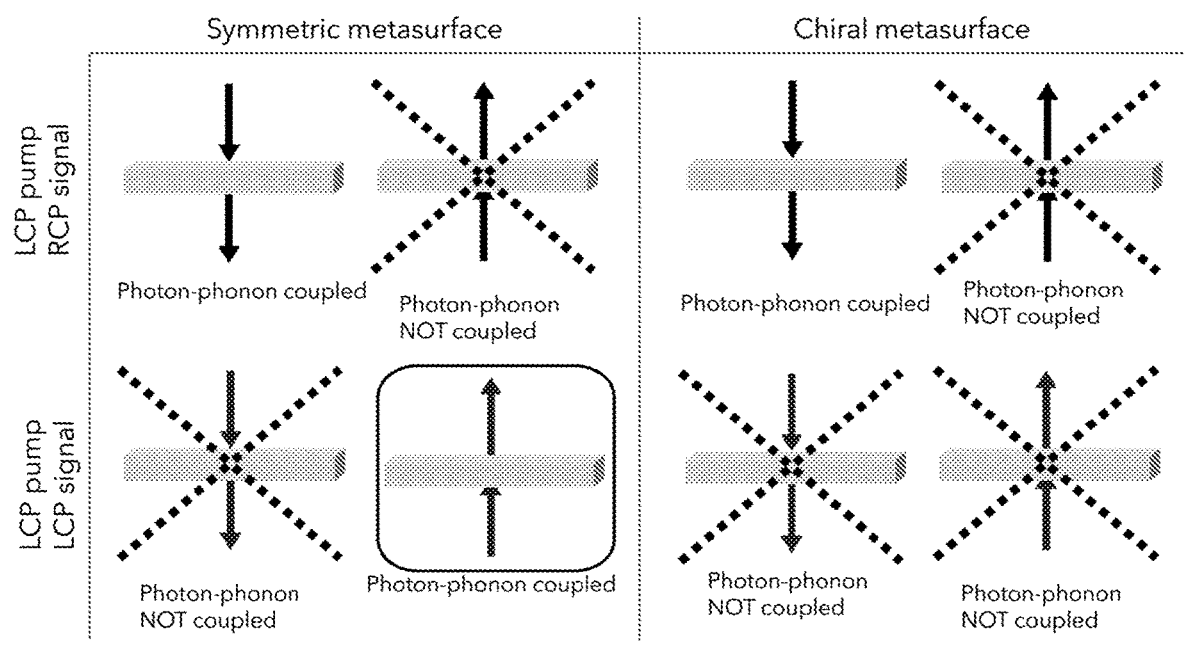
FIG. 6 shows the need for both chirality and spin-dependent gain to provide isolation.

The metasurface becomes a self-isolated light source when a circularly-polarized pump bias is introduced. In particular, we utilize spin-polarized stimulated Raman scattering (SRS) to explicitly break reciprocity. Pumping a Raman-active crystal with sufficiently intense light results in the spontaneous creation of a phonon, which generates a Stokes-shifted spectral sideband (FIG. 2B). Introducing a second light source at the sideband frequency stimulates this process, resulting in Raman amplification of this second, signal beam. This process defines stimulated Raman scattering and Raman lasing. Considering stimulated Raman scattering in a spin-polarized basis, spin selection rules arise for photon-phonon interactions that dictate when stimulated emission occurs. This condition is met in silicon for pump and signal beams of opposite handedness when propagating in the same direction, which we refer to as the forward direction. While a spin-polarized Raman bias is sufficient to achieve nonreciprocal gain for a time-reversed pair of modes, a signal propagating in the backward direction will still experience gain if the signal is not polarized with the appropriate handedness, as is the case upon reflection of the signal (FIG. 6). However, in a three-dimensionally chiral metasurface, the modes which correspond to the Raman forbidden polarization are restricted from being excited.

The symmetry of the Raman tensor describes how the phonon mode vibrates spatially in response to the pump electric field. We note that when pumping silicon with circularly-polarized light, the pump induces an antisymmetric susceptibility perturbation, in which $\chi_{xy}=-\chi_{yx}$, where $\chi$ is the susceptibility modification. This process provides amplification for one circularly-polarized mode of a time-reversed pair and consequently breaks reciprocity. The details of the Raman tensor and calculation are described in Section C2. Moreover, the local field confinement provided by our high-Q metasurface can greatly reduce the necessary pump power. The existing structure exhibits local field enhancement of $|E|/|E_0|=74$ at 1865.5 nm and Q's of 4810 (at 1865.3 nm) and 5100 (at 1865.7 nm) while maintaining the rotation of the local electric field (FIGS. 5A-D).

Figure 4A:
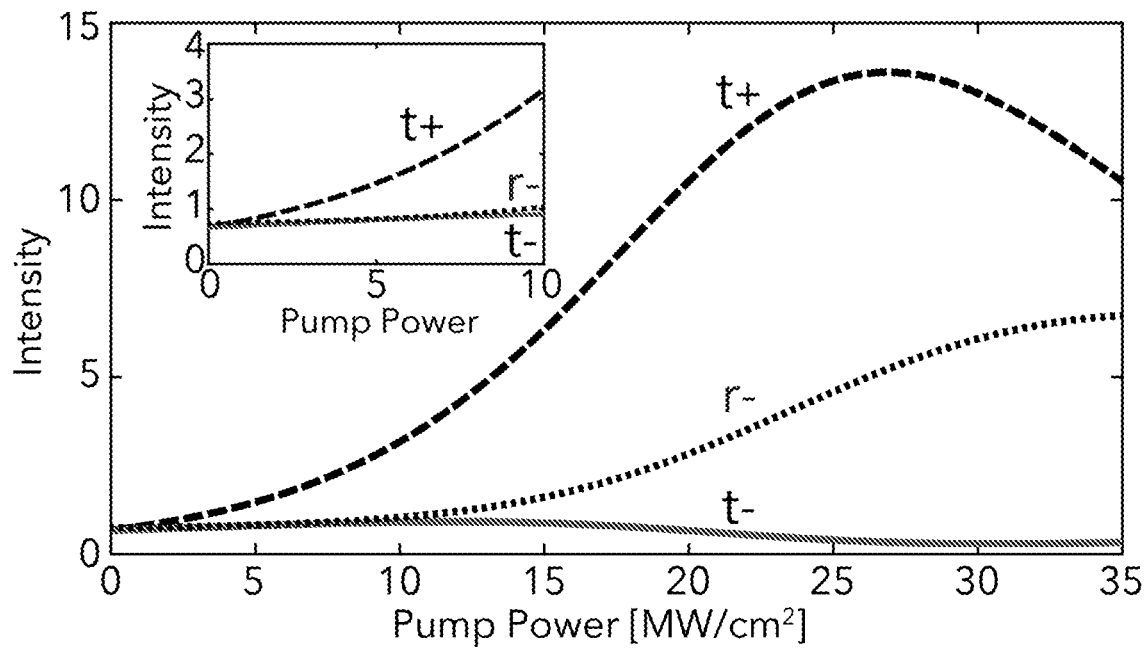
FIGS. 4A-B show lasing results of the example of section B.
Figure 4B:
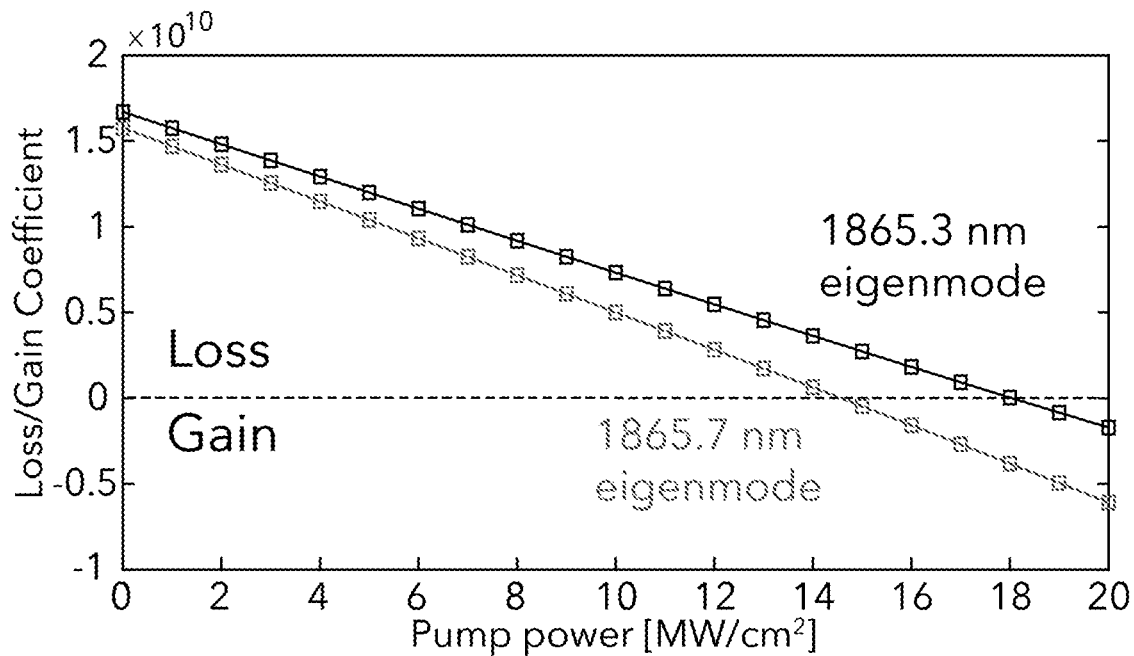

FIG. 4A shows transmittance and reflectance of the signal as a function of the pump power with a left-handed circularly-polarized pump. Inset: The plot is recreated with a decibel scale. FIG. 4B shows the imaginary component of the complex eigenfrequencies of the chiral metasurface, plotted as a function of the pump power.

The isolator-like behavior and nonreciprocal lasing is described in FIG. 4A. We fix the pump to be L-CP and observe transmission (t) and reflection (r) of the signal as we vary the pump power. While the metasurface is designed for intrinsic chirality, the presence of linear birefringence dictates that the polarization basis of the chiral mode is neither entirely circular nor linear. To accommodate the ellipticity of the metasurface eigenmodes, we consider a signal polarized in the basis of the chiral resonance, which we obtain by solving for the eigenvectors of the transmission scattering matrix (Section C2.1). The signal polarization state by this method is given by its Jones vector, E=[0.9803+0i, −0.1822+0.0770i], which is nearly linearly-polarized. For this polarization state, we begin to observe amplification of a forward-propagating signal (t+) and suppression of its reflection (r−) starting around 2 MW/cm$^2$ (FIG. 4A). A backward-propagating signal (t−) is suppressed and does not experience gain. We consider this system in an entirely circular basis and an entirely linear basis in Section C3, and we observe amplification of the forward signal and suppression of the backward signal regardless of the signal polarization. Therefore, the dominant and appreciable gain giving rise to lasing only occurs for a signal polarization state and single propagation direction, making our three-dimensionally chiral metasurface a self-isolated laser.

We perform an eigenmode analysis of the metasurface to provide direct evidence of lasing behavior and exemplify the response dependence on the signal frequency. As seen in FIG. 4B, the metasurface exhibits negative damping (i.e. gain) at increasing pump powers for both of the chiral eigenmodes, where the zero-crossing for the two eigenmodes occurs at approximately 14.5 MW/cm$^2$ for the eigenmode at 1865.7 nm and 18 MW/cm$^2$ for the eigenmode at 1865.3 nm. The difference between the transmitted signal and its reflection can be maximized by tuning the signal frequency relative to the two eigenfrequencies of the metasurface, which can also be modified by modifying the metasurface dimensions (Section C3). Generally, we observe that a Raman lasing mode exists in which the lasing cavity (i.e. the chiral metasurface) is self-isolating and the reflection is suppressed, regardless of the signal polarization or signal power.

In summary, we present a submicron lasing cavity with a nonzero chirality parameter and asymmetric permittivity that, together, impose isolation on the lasing mode emitted from that cavity. Here, optical isolation is not considered as an additional photonic component but as a feature built natively into the light source itself. Importantly, we break Lorentz reciprocity with a spin-polarized Raman bias that avoids dynamic reciprocity, which has no lower size limit and can be applied to a wide array of dielectric materials. We present a broad parameter space over which the lasing properties can be optimized, including modifying the chiral resonance by changing the nanoantenna dimensions, tuning the signal frequency relative to the two eigenmodes of the metasurface, and/or modifying the signal polarization. To further reduce the lasing threshold, this platform could capitalize on recent developments in ultra-high-Q and doubly-resonant cavities. Beyond subwavelength nonreciprocal and multifunctional integrated light sources, our three-dimensional chiral metasurface could also enable advances in topological photonics and nanophotonic sensing platforms.

C) Supplemental Information

C1) Chiral Metasurface Characterization and Optimization

Figure 5B:
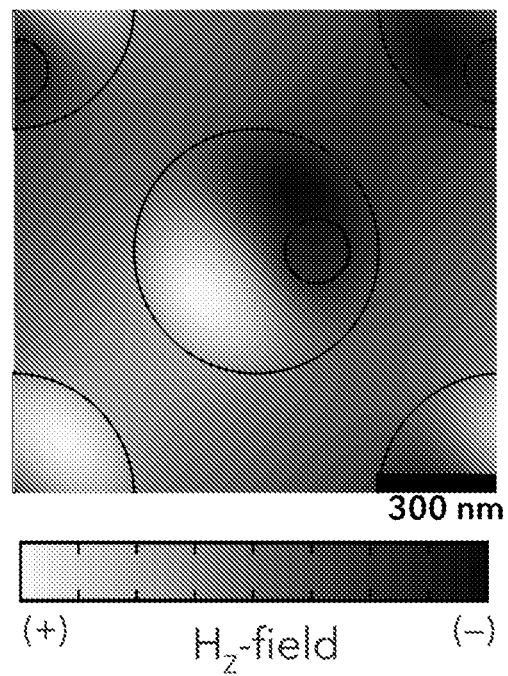
Figure 5C:
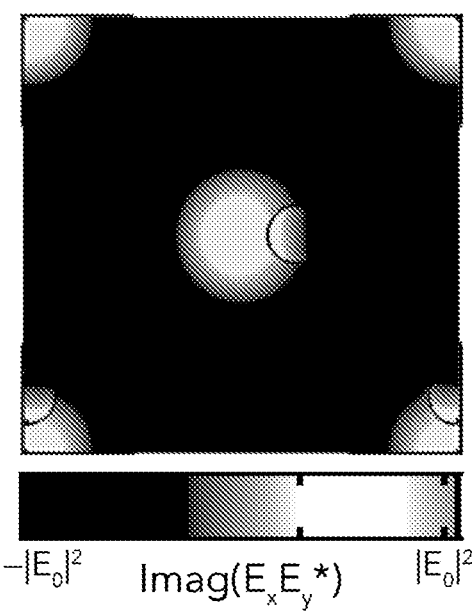

For the final chiral metasurface design, we plot both the normalized electric and magnetic field [FIGS. 5A-B] on resonance at 1865.5 nm, as well as the rotation of the electric field [FIG. 5C]. Here, we see the coupling between neighboring cylinders in addition to the coupling of the electric and magnetic fields, as exhibited by the alternating phase relationship of neighboring cylinders. FIG. 5C indicates that the local rotation of the electric field is conserved within the silicon, which is a prerequisite for spin-dependent gain.

The difference between transmission of left- and right-handed circularly polarized light can be further optimized by considering more optimal height, diameter, and periodicity parameters. We reiterate that our nonreciprocity relies more on the rotation of the electric field within the volume of the cylinder, which we confirm in FIG. 5C, taken at 1865.5 nm with the metasurface dimensions from Section B (i.e. h=600 nm). The mode profile and characteristics, as shown in FIGS. 5A-C, remain identical with the optimized height (h=640 nm), so we do not repeat these results.

FIG. 5A is a normalized electric field plot and FIG. 5B is an out-of-plane magnetic field plot at the center of the metasurface at 1865.5 nm. FIG. 5C shows E-field spin corresponding to the metasurface of section B at 1865.5 nm.

We note that along the +45° axis (as defined in FIG. 3B), the distance between notches is equidistant when traveling from one unit cell to the next, while along the −45° axis, a biperiodic spacing exists between the notches; this physical imposition of even/odd symmetry splitting is then imbedded in the splitting of eigenstates of the metasurface seen in FIG. 3B.

C1.1) The Need for Chirality for Spin-Dependent Isolation

This work considers two spin-dependent phenomena—chirality and spin-polarized pumping. We provide a figure that deconvolutes these two contributions and highlights the need for intrinsic chirality, even though a spin-polarized pump is sufficient to break Lorentz reciprocity:

FIG. 6 is a schematic representation of nonreciprocal behavior with an achiral metasurface (left column) versus a chiral metasurface (right column). The pump polarization is fixed to LCP for both cases, but the two rows indicate the two polarization states for the signal, LCP versus RCP.

Importantly, the achiral (symmetric) metasurface allows backward-propagating signals due to the handedness of the signal polarization flipping upon reflection [FIG. 6]. In other words, the achiral case protects against the backward-propagating signal if the source and detector positions are switched, but the achiral case does not protect against time-reversed (reflected) signal. The chiral case only allows transmission of the signal in one direction, regardless of polarization, defining isolation.

C2) Stimulated Raman Scattering Modeling

Stimulated Raman scattering is a third-order nonlinear optical process and therefore is characterized by a nonlinear susceptibility term that considers contributions at the pump frequency and at the Stokes frequency to generate the amplification of the Stokes signal. The pump can be considered as a fixed optical bias within the undepleted pump approximation, assuming that the pump strength is much greater than that of the signal. Modeling this process is then a two-step process, where the linear behavior of the pump is first calculated to determine the local electric field with which the signal will interact, and the resulting electric field distribution is used to determine an effective modification to the permittivity tensor at the signal frequency. The simulation is then run at the signal frequency with the new, modified permittivity tensor. We fix the Stokes-shifted signal frequency to be at the center of the chiral resonance, $\lambda_s$=1865.5 nm. The Raman shift is determined by the optical phonon frequency, which for silicon occurs at ~15.6 THz. Our pump frequency is therefore set at $\lambda_p$=1837.1 nm. Assuming a perfectly crystalline silicon structure in which the crystal lattice is aligned with the metasurface lattice, the relative permittivity tensor near the signal wavelength $\lambda_s$ is then, $$\overline{\overline{\epsilon_r}}(r) = $$

$$\overline{\overline{n_s^2}} + \chi_{res} L(\delta) \begin{pmatrix} |p_y(r)|^2 + |p_z(r)|^2 & p_x^*(r)p_y(r) & p_x^*p_z(r) \\ p_y^*(r)p_x(r) & |p_x(r)|^2 + |p_z(r)|^2 & p_y^*p_z(r) \\ p_z^*(r)p_x(r) & p_z^*p_y(r) & |p_x(r)|^2 + |p_y(r)|^2 \end{pmatrix}$$

where p(r) represents the electric field vector distribution after exciting with the pump, $\chi_{res}$ is a real number used to represent the peak Raman susceptibility related to the Raman gain in silicon, which is set to $\chi_{res}$=11.2× $10^{-18}(mV^{-1})^2$, and $n_s$ is the linear refractive index of the silicon, here set to 3.45 for the near-infrared. The shape of the Raman transition is described by a Lorentzian function, $$L(\delta) = \frac{2\Omega\Gamma}{\Omega^2 - \delta^2 + i2\delta\Gamma} \text{ where } \delta = 2\pi c\left(\frac{1}{\lambda_p} - \frac{1}{\lambda_s}\right),$$

the zone-center optical phonon frequency $\Omega$=15.6 THz, and its halfwidth $\Gamma$≈53 GHz.

The Lorentzian function, L(δ), that defines the resonant mode of our device necessarily peaks when the loss/gain term in the denominator, Γ, approaches zero. This loss/gain term can capture all sources of gain and loss in the system, including the intrinsic loss of the cavity, the gain from pumping the cavity, and all radiative and nonradiative losses. We neglect nonradiative losses for this model system, which would be most affected by free-carrier absorption at higher pump powers. Experimentally, such free-carrier absorption can be mitigated by electrical extraction. Here, we define lasing as the point at which the gain term from Raman amplification balances the intrinsic loss of the metasurface cavity such that Γ=0. FIG. 4B illustrates this point, which occurs at a pump power of ~15 MW/cm². In the case when the signal frequency exactly matches the eigenfrequency of the metasurface and is exactly offset from the pump frequency by the Raman shift in silicon (15.6 THz), the Lorentzian function approaches infinity and corresponds to a singularity in the scattering matrix of the system. Under these conditions, the amplification approaches infinity. At higher pump powers, the gain term from Raman amplification continues to grow, but the intrinsic loss of the cavity remains the same. Under these conditions, the overall gain/loss term F cannot equal zero, and the overall transmittance from the cavity is attenuated. This limitation is the reason that the transmission and reflection curves peak at a discrete pump power and do not continue to increase at higher pump powers.

Experimental lasing demonstrations report the total power of the laser emission, which continues to grow at higher pump powers due to the continued amplification of spontaneous emission. However, we report amplified transmission of the Stokes light, which is not the power of actual laser emission. This approach is appropriate for defining lasing conditions relevant to our system, such as pump threshold power and directionality of the lasing modes. Our results indicate that beyond a certain power threshold, the Stokes signal couples less efficiently to the resonant cavity, but this does not mean that total amplification is also reduced. In contrast, experimental demonstrations of lasing will show that increasing the pump power results in increased emission up until other loss mechanisms begin to dominate.

Throughout this study, results are obtained by performing frequency domain calculations using the finite element solver COMSOL. Each metasurface design considered in the main text has a lattice period smaller than the shortest illumination wavelength. We thus model transmission through the periodic arrays by applying continuously periodic boundary conditions to the sides of a single unit cell and port boundary conditions at the top and bottom of the cell. Silicon was used as both the resonator material and the Raman active material (in the linear regime, n=3.45), with the background is set to vacuum (n=1). The quality factors reported are retrieved from an eigenfrequency study in COMSOL under the same conditions.

C2.1) Defining the Polarization Basis

While the metasurface is designed for intrinsic chirality, the presence of linear birefringence in addition to circular birefringence dictates that the basis for the chiral modes is elliptical. There are several methods to obtain the polarization eigenstate of the metasurface, which will be the simplest basis in which to work, and we choose to perform diagonalization on the s-parameter transmission matrix. By illuminating the metasurface in a linear basis and collecting the transmission coefficients for the two polarization states (x- and y-polarization), we construct a 2×2 matrix indicating the transmission of linearly-polarized waves. Solving for the two eigenvectors of this matrix gives us two polarization states of this metasurface. We choose to work with the eigenvector that corresponds to the largest eigenvalue, which will maximize the transmission of the linear (not-pumped) metasurface. Section C3 presents the results in an entirely circular basis and an entirely linear basis.

C3) General Parameter Space of Nonreciprocal Lasing in a Chiral Metasurface

Figure 7A:
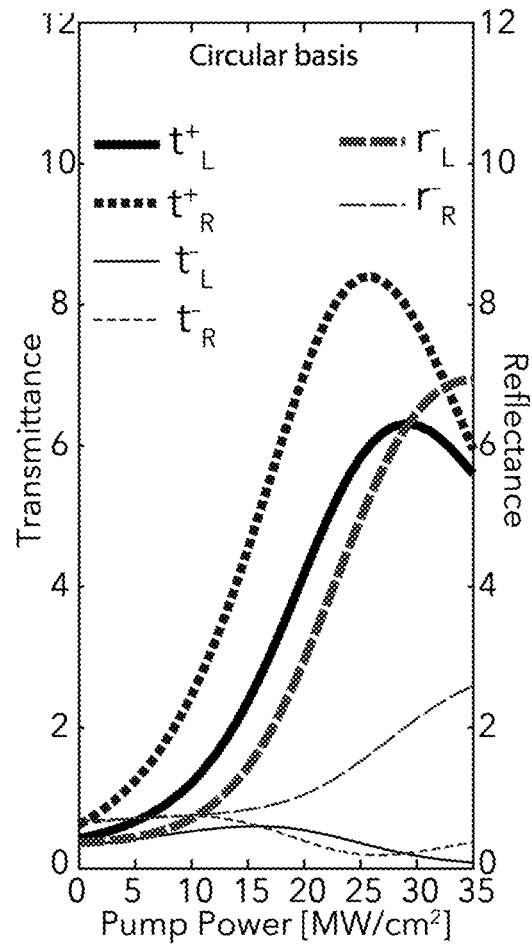
FIGS. 7A-B show isolation results for circular polarization basis and linear polarization basis.
Figure 7B:
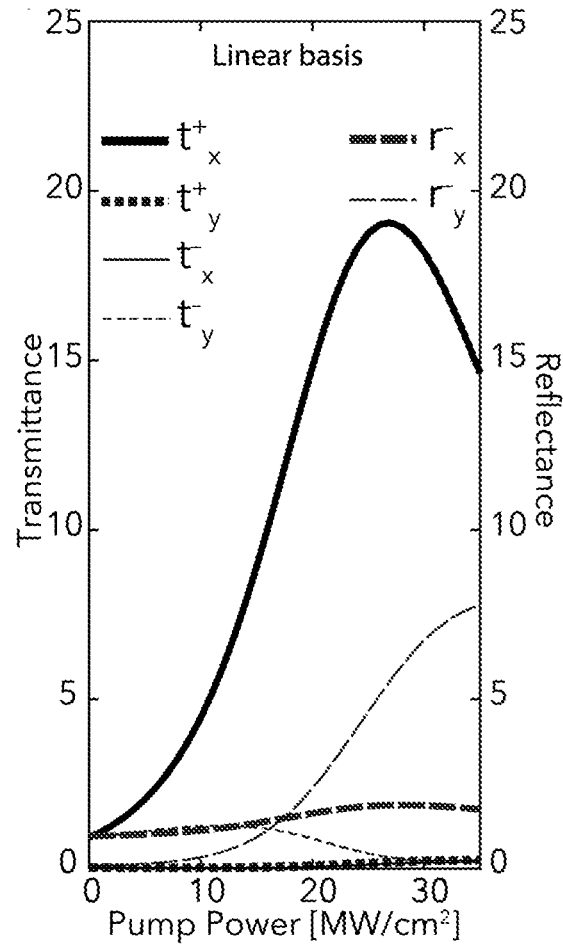

In Section B, we report the operation of a signal in the basis of the eigenstate of the metasurface mode, which shows isolator-like behavior. However, this behavior exists for an arbitrarily polarized signal beam, regardless of if the signal is polarized in a circular or linear basis. Adding the intensity of all transmitted light and appropriately normalizing results in FIG. 4A regardless of the polarization state, as long as the scattering matrix comprises a complete basis. In FIG. 7A, we recreate FIG. 4A for a signal polarized in a circular basis. Similarly, in FIG. 7B, we recreate FIG. 4A for a signal polarized in a linear basis. In FIGS. 7A-B each polarization state is plotted separately. As above, the pump is L-CP and the legend is defined with respect to the schematic in FIG. 2B.

Figure 8A:
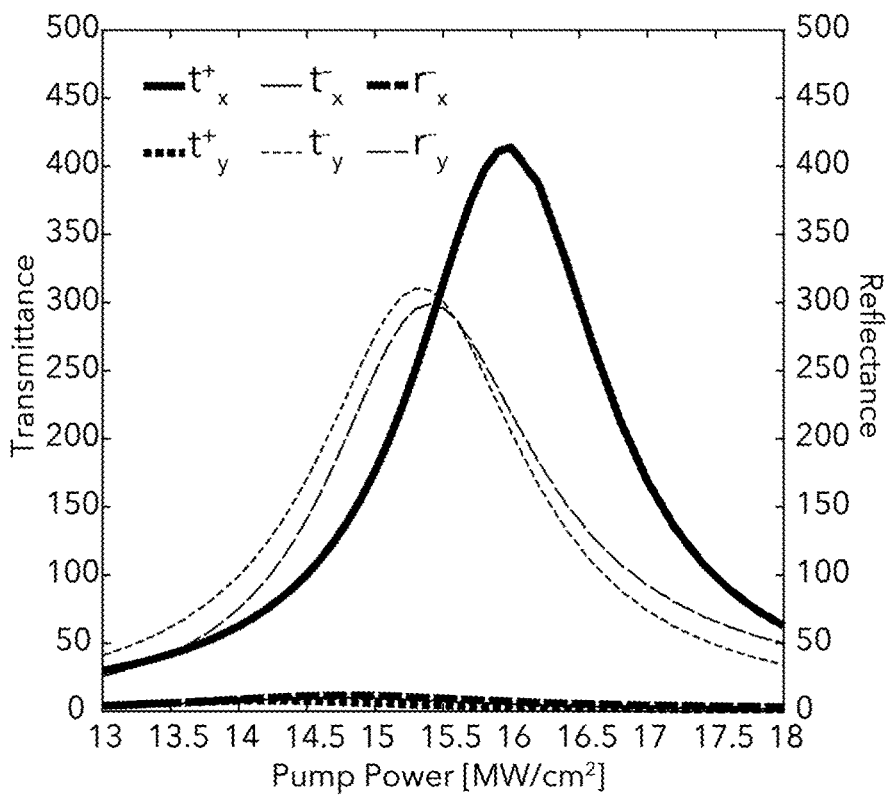
FIGS. 8A-B show signal vs. pump power at two different Stokes frequencies.
Figure 8B:
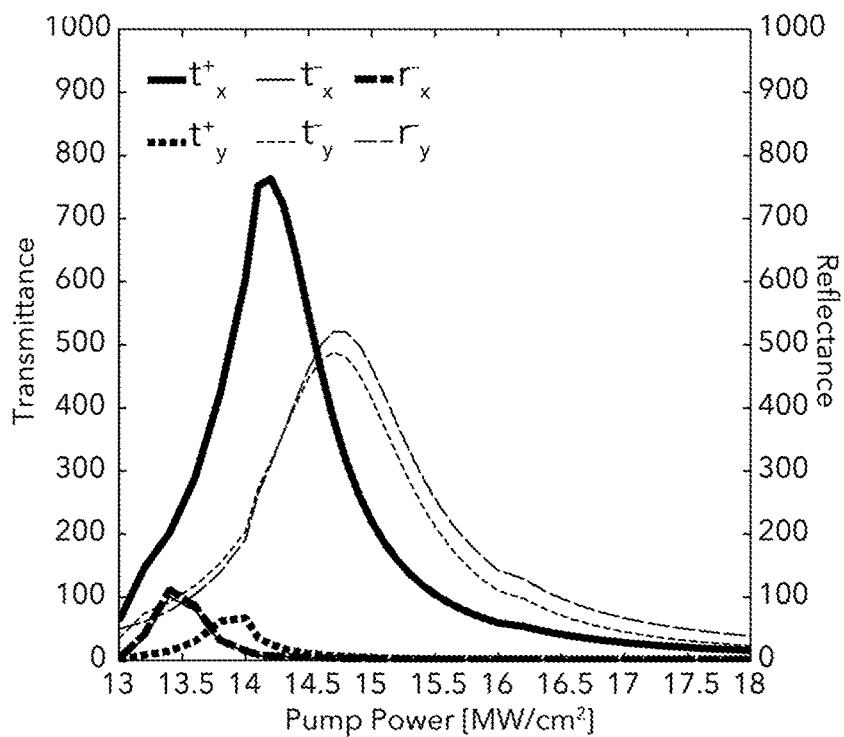

We also begin to show the dependence of the signal relative to where the Stokes frequency is chosen (and therefore where the pump frequency is chosen), which is a useful parameter to optimize for a desired transmission response. For example, in FIG. 8A we set the Stokes frequency to be 1865.3 nm and in FIG. 8B we set the Stokes frequency to be 1865.7 nm. Transmission increases dramatically when the Stokes frequency approaches an eigenfrequency of the metasurface, noting that the eigenfrequency of the metasurface will slightly shift with increasing pump power. Here, the signal frequency is still set to be exactly Stokes-shifted from the pump frequency (by 15.6 THz for silicon), although we note that the signal may be offset from the Stokes frequency instead as another tuning parameter.

C4) Lasing Behavior of the Chiral Metasurface

Figure 9:
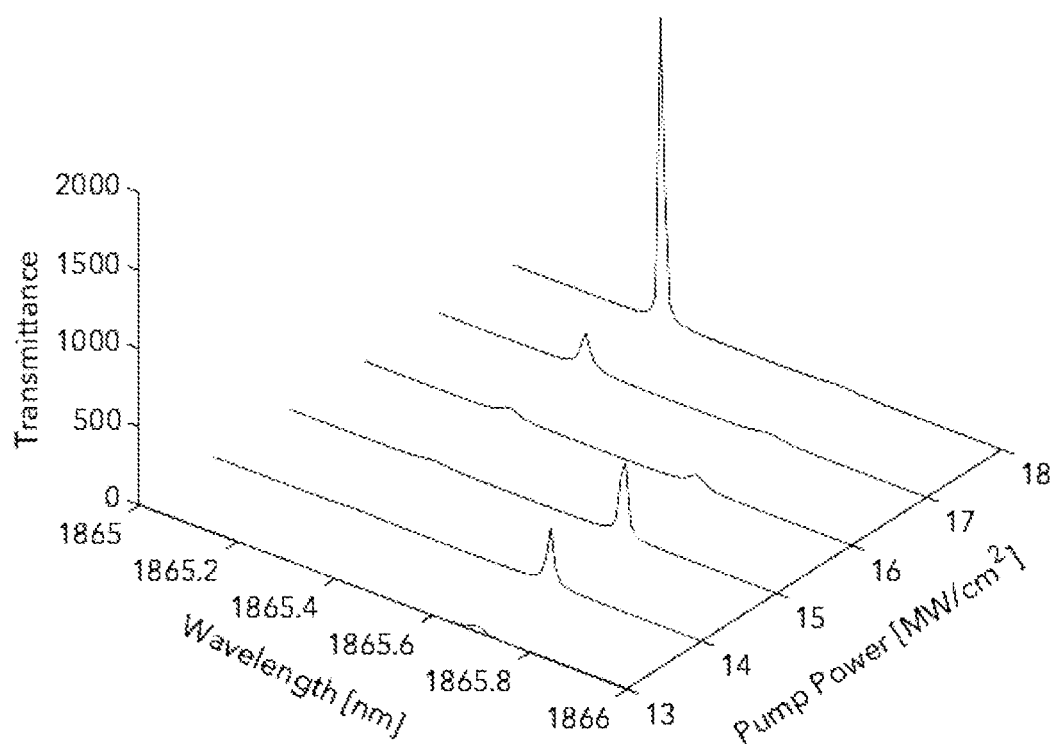
FIG. 9 shows transmittance spectra at various pump powers.

Plotting the transmission spectra as a function of increasing pump power further demonstrating the lasing behavior of our metasurface cavity [FIG. 9]. At higher pump powers, we see that transmittance increases as a function of pump power and, importantly, that the linewidth of the resonance narrows. This behavior occurs for both chiral eigenmodes of the metasurface, with a different power dependence for each mode. The high transmittance observed occurs because this computation was performed near one of the eigenfrequencies of the metasurface ($\omega_s$=1865.37 nm), similar to the calculation for FIGS. 8A-B (except not restricted to observation of a linearly-polarized signal).

The invention claimed is:

1. A self-isolated coherent light source comprising:
a pump source configured to provide pump radiation having a not-linear state of polarization;
a spin-selective gain medium configured to provide gain when excited by the pump radiation;
an optical resonator configured to define a lasing mode when the spin-selective gain medium is excited by the pump radiation; and
a chiral metasurface configured to provide less loss to the lasing mode than to a back-reflection of the lasing mode.

2. The self-isolated coherent light source of claim 1, wherein the pump radiation has an ellipticity e of its state of polarization such that $0.5 \leq |e| \leq 1.0$.

3. The self-isolated coherent light source of claim 2, wherein the pump radiation has an ellipticity e of its state of polarization such that $0.9 \leq |e| \leq 1.0$.

4. The self-isolated coherent light source of claim 1, wherein the spin-selective gain medium is a Raman-active medium.

5. The self-isolated coherent light source of claim 1, wherein the spin-selective gain medium is an inversion-asymmetric transition metal dichalcogenide.

6. The self-isolated coherent light source of claim 1, wherein the chiral metasurface is formed of a surface of the spin-selective gain medium.

7. The self-isolated coherent light source of claim 1, wherein the chiral metasurface is the spin-selective gain medium.

8. The self-isolated coherent light source of claim 1, wherein the chiral metasurface is distinct from the spin-selective gain medium.

9. The self-isolated coherent light source of claim 1, wherein the chiral metasurface is distinct from the optical resonator.

10. The self-isolated coherent light source of claim 1, wherein the chiral metasurface has a resonance that serves as the optical resonator.

11. The self-isolated coherent light source of claim 1, wherein the chiral metasurface has a quality factor Q of 10 or more.

* * * * *